US00RE40717E

(19) United States
(12) Reissued Patent
Waldenstrom

(10) Patent Number: US RE40,717 E
(45) Date of Reissued Patent: Jun. 9, 2009

(54) METHOD OF MAKING A CEMENTED CARBIDE POWER WITH LOW COMPACTING PRESSURE

(75) Inventor: Mats Waldenstrom, Bromma (SE)

(73) Assignee: Sandvik Intellectual Property AB, Sandviken (SE)

(21) Appl. No.: 11/484,832

(22) Filed: Jul. 12, 2006

Related U.S. Patent Documents

Reissue of:
(64) Patent No.: 6,273,930
Issued: Aug. 14, 2001
Appl. No.: 09/543,101
Filed: Apr. 4, 2000

(30) Foreign Application Priority Data

Apr. 6, 1999 (SE) ..... 9901216-3

(51) Int. Cl.
*B22F 9/04* (2006.01)
*C22C 29/02* (2006.01)

(52) U.S. Cl. ..... 75/352

(58) Field of Classification Search ..... 419/18, 419/32; 75/240, 352; 428/570
See application file for complete search history.

(56) References Cited

U.S. PATENT DOCUMENTS

| | | | | | |
|---|---|---|---|---|---|
| 2,894,837 | A | * | 7/1959 | Onstott et al. | 419/5 |
| 5,403,541 | A | | 4/1995 | Oskarsson et al. | |
| 5,423,899 | A | * | 6/1995 | Krall et al. | 75/231 |
| 5,844,153 | A | | 12/1998 | Schlatter et al. | |
| 5,882,376 | A | | 3/1999 | Kim et al. | |
| 5,885,653 | A | | 3/1999 | Waldenström et al. | |
| 5,902,942 | A | | 5/1999 | Maderud et al. | |
| 6,336,951 | B1 | * | 1/2002 | Qvick et al. | 75/240 |

* cited by examiner

*Primary Examiner*—Roy King
*Assistant Examiner*—Ngoolan T. Mai
(74) *Attorney, Agent, or Firm*—Drinker Biddle & Reath LLP

(57) ABSTRACT

The present invention relates to a method of making a cemented carbide with submicron WC grain size with a powder metallurgical technique including milling, pressing and sintering. The method includes milling all components except WC for about three hours, then adding the WC powder and milling for about ten additional hours. In this way a cemented carbide powder with acceptable low compacting pressure is obtained.

5 Claims, No Drawings

METHOD OF MAKING A CEMENTED CARBIDE POWER WITH LOW COMPACTING PRESSURE

Matter enclosed in heavy brackets [ ] appears in the original patent but forms no part of this reissue specification; matter printed in italics indicates the additions made by reissue.

*CROSS-REFERENCES TO RELATED APPLICATIONS*

*The present application is a reissue of U.S. Pat. No. 6,273,930 B1, filed on Apr. 4, 2000, which claims the benefit of priority to Swedish Application No. 9901216-3 filed Apr. 6, 1999.*

FIELD OF THE INVENTION

The present invention relates to a submicron cemented carbide powder with low compacting pressure, particularly useful for cutting tool inserts for turning, milling and drilling steels and stainless steels.

BACKGROUND OF THE INVENTION

Cemented carbide is made by wet milling of powders forming hard constituents and binder phase to a slurry, drying the slurry generally by spray drying, tool pressing the dried powder to bodies of desired shape and finally sintering. During sintering the bodies shrink about 20% linearly. The shrinkage depends on pressing pressure, WC grain size, WC grain size distribution and Co-content. Pressing tools are expensive to make and are therefore made for a standard shrinkage such as 18%. This shrinkage is obtained by choosing a particular pressing pressure. However, if the grain size is submicron or finer the pressing pressure is relatively high, 250–300 MPa. A high pressing pressure is not desirable because of the risk of pressing cracks in the pressed bodies and abnormal wear and even risk of pressing tool failure. It is therefore desirable to find methods of reducing the pressing pressure when making submicron cemented carbides.

SUMMARY OF THE INVENTION

It has now surprisingly been found that a submicron cemented carbide powder with an apparent reduced compacting pressure at a predetermined weighing in exhibiting no more than 18% shrinkage can be made from powder mixtures having submicron hard constituents with narrow grain size distributions which are conventionally milled at greatly reduced milling times.

According to the present invention, a method of making a powder comprising a plurality of compounds including hard constituents and a binder phase, the powder having a low compacting pressure, the method comprises the steps of:

(i) premilling a mixture of components which does not include the WC for more than 2 hours;

(ii) adding the WC to the mixture of step (i) and milling for approximately 10 hours; and (iii) drying the milled mixture to obtain a powder.

DETAILED DESCRIPTION OF THE INVENTION

According to the invention there is now provided a submicron cemented carbide powder with the desired low compacting pressure <200 MPa, preferably <175 MPa at 18% shrinkage and excellent compacting properties for cutting tool inserts comprising WC and 6–15 wt-% Co, preferably 8–12 wt-% Co and less than 1 wt-% Cr, preferably 0.2–0.6 wt-% Cr and/or less than 1 wt-% V, preferably 0.2–0.6 wt-% V.

The WC-grains have an average grain size in the range 0.2–1.0 μm, preferably 0.4–0.6 μm with no WC grains greater than 1.5 μm.

The W-content in the binder phase can be expressed as the "CW-ratio" defined as:

$$\text{CW-ratio}=M_s/(\text{wt \% Co}*0.0161)$$

where $M_s$ is the measured saturation magnetization of the sintered cemented carbide body in [kA/m] *$hAm^2/kg$* and wt % Co is the weight percentage of Co in the cemented carbide. The CW-ratio in inserts according to the invention shall preferably be 0.80–1.0, and most preferably 0.80–0.90. The amount of W dissolved in binder phase is controlled by adjustment of the carbon content by small additions of carbon black or pure tungsten powder.

According to the method of the present invention, the milling procedure is started with a >2 hours, preferably about 3 hours, pre-milling step including wet milling in ethanol with cemented carbide milling bodies of all components except of WC such as grain growth inhibitors, carbon black or tungsten powder, binder metal and pressing agent, respectively. The pre-milling step is followed by a further final milling step of about 10 hours with the WC powder included. The amount of milling bodies during the pre-milling and final milling shall be such that the weight ratio milling bodies: WC powder is about 4–7. The cemented carbide powder is then dried preferably by spray drying, pressed to inserts and sintered.

WC-powder with submicron grain size distribution according to the invention with no grains greater than 1.5 μm is prepared by milling/sieving such as in a jetmill-classifier. According to the present invention, a minimal change in grain size and/or grain size distribution results from the final milling step.

EXAMPLE 1

A submicron cemented carbide powder with the composition including WC and 0.5 weight % Cr, 0.4 weight % V and 10 weight % Co with a grain size of 0.4 μm were produced according to the invention. The milling was carried out in ethanol (0.3 l fluid per kg cemented carbide powder) in a 30 l mill with 120 kg milling balls. The batch size was 20 kg. An initial milling step was carried out with all components added ($C_3C_2$, VC and Co) except WC for approximately 3 hours. Furthermore, 0.4 kg (2 weight %) lubricant, was added to the slurry and the carbon content was adjusted with carbon black such that a binder phase alloyed with W having a CW-ratio of 0.85 is obtained. The milling procedure was then completed with a 10 hour final milling step with the raw WC material included. A well deagglomerated WC, $d_{wc}$=0.4 μm (jetmilled and sieved) was used. After spray drying, inserts of the type N151.2-400-4E were compacted and sintered according to standard practice. A compacting pressure of 165 MPa (18% shrinkage) and excellent inserts with no crack tendencies were obtained. Furthermore dense sintered structures with no porosity and hardness HV3=1800 were obtained.

EXAMPLE 2

Cemented carbide tool inserts of the type N151.2-400-4 E were produced in the same way as in Example 1 but with the composition having 0.5 weight % Cr, 0.3 weight % V and 8 weight % Co. The same result as in Example 1 was obtained except that a compacting pressure of 170 MPa (18% shrinkage) and a hardness of HV3=1890 resulted.

EXAMPLE 3

Cemented carbide tool inserts of the type N151.2-400-4 E were produced in the same way as in Example 1 but with the composition having 0.5 weight % Cr, 0.3 weight % V and 10 weight % Co and a grain size of 0.6 μm. The same result as in Example 1 was obtained except that a compacting pressure of 160 MPa (18% shrinkage) and a hardness of HV3-1740 resulted.

EXAMPLE 4

Cemented carbide standard tool inserts of the type N151.2-400-4 E were produced with the same chemical composition, average grain size of WC and CW-ratio as in Example 1 but from powder manufactured with conventional ball milling techniques and with a milling time of 80 hours. Roughly the same physical properties (porosity A00; HV3=1820) were obtained as in Example 1, but a considerably higher compacting pressure resulted, 290 MPa, (18% shrinkage) and because of this inserts with pronounced crack and chipping tendencies were obtained.

The foregoing has described the principles, preferred embodiments and modes of operation of the present invention. However, the invention should not be construed as being limited to the particular embodiments discussed. Thus the above-described embodiments should be regarded as illustrative rather than restrictive, and it should be appreciated that variations may be made in those embodiments by workers skilled in the art without departing from the scope of the present invention as defined by the following claims.

I claim:

1. A method of making a submicron cemented carbide powder comprising a plurality of components including submicron WC and binder metal, the powder having a low compacting pressure, the method comprising the steps of:

(i) pre-milling a mixture of components which does not include the WC for more than 2 hours;

(ii) adding the WC to the mixture of step (i) and milling for approximately 10 hours; and (iii) drying the milled mixture to obtain a powder.

2. The method of claim 1, wherein the mixture of components in step (i) comprises grain growth inhibitors, at least one of carbon black and tungsten powder and a pressing agent.

3. The method of claim 2, wherein the mixture of components in step (i) is wet milled in ethanol.

4. The method of claim 1, wherein the premilling step (i) is performed for approximately 3 hours.

5. The method of claim 1, wherein step (iii) comprises spray drying.

[6. A submicron cemented carbide powder having a compacting pressure of less than 200 MPa to obtain no more than 18% shrinkage upon sintering.]

[7. The powder of claim 6, where in the compacting pressure is less than 175 MPa.]

[8. The powder of claim 6 having a composition comprising 6–15 wt. % Co, less than 1 wt. % Cr and/or less than 1 wt. % V.]

[9. The powder of claim 8, having a composition comprising 8–12 wt. % Co, 0.2–0.6 wt. % Cr, and/or 0.2–0.6 wt. % V.]

[10. A submicron cemented carbide powder having a compacting pressure of less than 200 MPa to obtain no more than 18% shrinkage upon sintering the cemented carbide comprising:

WC grains having an average size of 0.2–1.0 μm.]

[11. The powder of claim 10, wherein the WC grains have an average size of 0.4–0.6 μm, with no WC grains greater than 1.5 μm.]

[12. A densified sintered cutting tool insert made from the powder of claim 6.]

[13. The insert of claim 12 having a CW ratio expressed as:

$$\text{CW-ratio} = Ms/(\text{wt. \% Co} * 0.016)$$

where Ms is the saturization magnetization of a sintered body made from the powder in kA/m, the CW ratio is 0.80–1.0.]

[14. The insert of claim 13, wherein the CW ratio is 0.80–0.90.]

[15. The insert of claim 14, having essentially no porosity and a hardness of at least 1740 HV3.]

* * * * *